Patented Aug. 11, 1925.

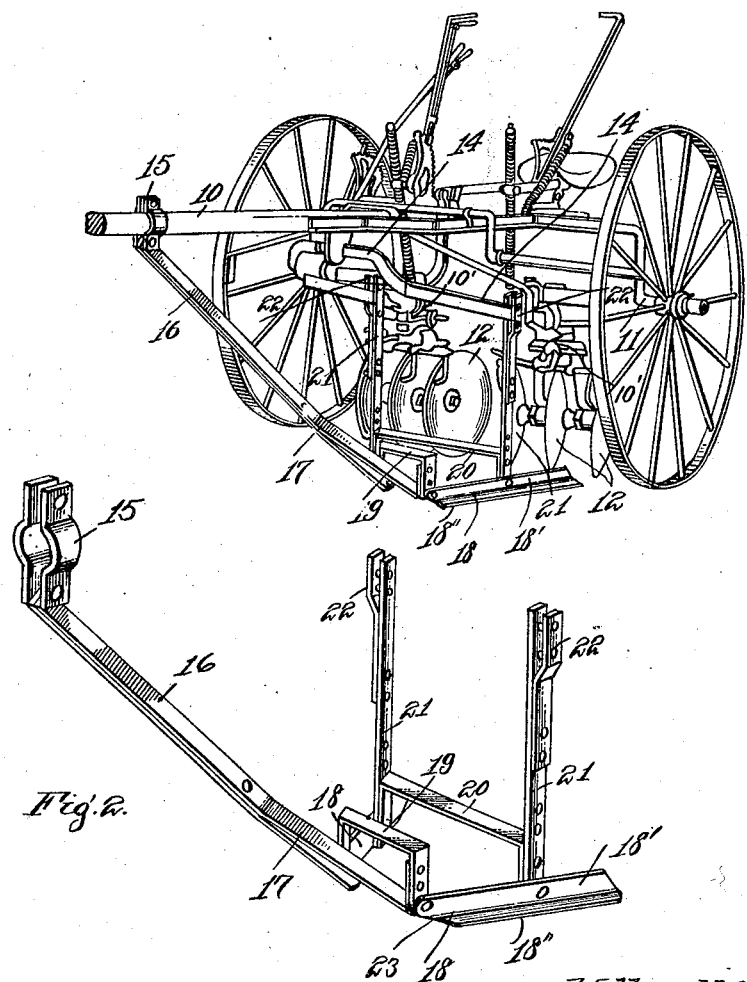

1,549,031

UNITED STATES PATENT OFFICE.

WALLACE H. SPURLING, OF THOMPSON, MISSOURI.

CULTIVATOR ATTACHMENT.

Application filed September 16, 1924. Serial No. 738,037.

*To all whom it may concern:*

Be it known that I, WALLACE H. SPURLING, a citizen of the United States, residing at Thompson, in the county of Audrain, State of Missouri, have invented certain new and useful Improvements in Cultivator Attachments; and I do hereby declare the following to be a full, clear, and exact description of the invention, such as will enable others skilled in the art to which it appertains to make and use the same.

This invention relates to new and useful improvements in agricultural machines, and particularly to attachments therefor.

One object of the invention is to provide an attachment for a cultivator which operates in advance of the cultivating disks, to cut out the weeds, at the sides of a row of plants, and throw the same away from the plants, the cultivator disks operating to restore the soil, thrown with the weeds, back to the sides of the plants.

Another object is to provide a device of this character which is simple in construction, and which is readily applicable to a cultivator without any modifications to the cultivator structure.

Other objects and advantages will be apparent from the following description when taken in connection with the accompanying drawing.

In the drawing:

Figure 1 is a perspective view of a disk cultivator, showing the invention applied thereto.

Figure 2 is a perspective view of the invention removed from the cultivator.

Referring particularly to the accompanying drawing, 10 represents the draft beam or tongue, which is secured to the arched axle 11, while 12 represents the cultivator disks.

Secured to the rear portion of the tongue 10 is the bight portion of a yoke member 14, and secured to the arms 14' of this yoke are the standards 10, which carry on their lower ends the cultivator disks 12. Carried by the tongue, forwardly of the bight portion of the yoke 13, is a clamp 15 and connected to the lower portion of the clamp are the downwardly and rearwardly extending arms 16, the lower portions of which diverge, as at 17, and are connected with the forward ends of the scraper blades 18. These blades 18 diverge rearwardly, as seen in the drawing, and connected to the forward ends of the blades, at points coincident with the points of attachment of the arms 16, are the lower ends of the legs of a vertical angular yoke 19. To the intermediate portions of these blades are connected the lower ends of a wider yoke 20, and also connected to the intermediate portions of the blades are the vertical arms 21. The upper ends of the arms 21 are provided with clamps 22 which are engaged in embracing relation to the arms 14', and constructed for vertical adjustment. Each of the blades has a vertical portion 18' and a downwardly and outwardly inclined cutting edge portion 18'', the forward end of the blade being cut obliquely downwardly and rearwardly, as shown at 23, whereby to more easily penetrate the soil, as the machine advances, by reason of the shearing cut produced thereby.

The sharp edges of the portions 18'' cut the weeds away from the plants, as will be readily understood, while the blades or disks 12 turn the soil back toward the plants, at the sides thereof. Thus the blades turn the soil over to expose the moist side uppermost, and then the disks spread the soil in a ridge along the row, so that the plants will be properly hilled. By this arrangement, the soil is properly worked at the sides of the plants, and the weeds removed or exposed to the sun for destruction.

It will be noted that the clamps of the beam, and on the rear arch are of such construction and arrangement that the device may be quickly and easily attached to the draft tongue and disk beams of a cultivator without any changes in the construction of the tongue or beams, thus rendering the device applicable to practically any cultivator.

What is claimed is:

An attachment for a cultivator comprising a yoke having divergent arms, a clamp carried by the convergent ends of the arms, a vertical yoke having its arms adjustably connected with the divergent ends of the said arms, angular scraper blades secured at their forward ends to the said divergent arms, a second vertical yoke having its arms secured to the intermediate portions of the said blades, said blades diverging from the said diverging arms and vertical arms secured in adjusting relation on the arms of the second vertical yoke and having their upper ends bifurcated.

In testimony whereof, I affix my signature, in the presence of two witnesses.

WALLACE H. SPURLING.

Witnesses:
 CHAS. C. BLEDSOE,
 R. G. BROWN.